US009614217B2

(12) United States Patent
Li (10) Patent No.: US 9,614,217 B2
(45) Date of Patent: Apr. 4, 2017

(54) NICKEL-ZINC SECONDARY BATTERY AND METHOD FOR PREPARING THE SAME

(75) Inventor: Ruiling Li, Guangdong (CN)

(73) Assignee: GUANGDONG POWERLINK ENERGY CO., LTD, Guangdong (CN)

(*) Notice: Subject to any disclaimer, the term of this patent is extended or adjusted under 35 U.S.C. 154(b) by 271 days.

(21) Appl. No.: 13/994,689

(22) PCT Filed: Jun. 15, 2012

(86) PCT No.: PCT/CN2012/076974
§ 371 (c)(1),
(2), (4) Date: Jun. 14, 2013

(87) PCT Pub. No.: WO2012/175001
PCT Pub. Date: Dec. 27, 2012

(65) Prior Publication Data
US 2014/0050970 A1      Feb. 20, 2014

(30) Foreign Application Priority Data
Jun. 22, 2011 (CN) .......................... 2011 1 0169887

(51) Int. Cl.
*H01M 4/44* (2006.01)
*H01M 4/52* (2010.01)
(Continued)

(52) U.S. Cl.
CPC ............. *H01M 4/366* (2013.01); *H01M 4/04* (2013.01); *H01M 4/26* (2013.01); *H01M 4/32* (2013.01);
(Continued)

(58) Field of Classification Search
CPC .......... H01M 4/48; H01M 4/52; H01M 4/244; H01M 4/525; H01M 10/30; H01M 10/0431
See application file for complete search history.

(56) References Cited

U.S. PATENT DOCUMENTS 5,989,746 A * 11/1999 Bernard .................. H01M 4/32
429/223
6,497,976 B1 * 12/2002 Morizane ........................ 429/71
(Continued)

FOREIGN PATENT DOCUMENTS

CN        1174419        2/1998
CN        1503994 A      6/2004
(Continued)

OTHER PUBLICATIONS

Chinese Office Action dated Feb. 21, 2013, Chinese Patent Application No. CN201110169887.3.
(Continued)

*Primary Examiner* — Ula C Ruddock
*Assistant Examiner* — Thomas Parsons
(74) *Attorney, Agent, or Firm* — Vierra Magen Marcus LLP (57) ABSTRACT

The present invention provides a nickel-zinc secondary battery, including: a battery case; an electrode assembly, disposed in the battery case; and an electrolyte solution, positioned in the battery case, and filled around the electrode assembly, wherein the electrode assembly includes a nickel positive electrode, a zinc negative electrode, and a membrane separator disposed between the nickel positive electrode and the zinc negative electrode; the nickel positive electrode includes: a substrate and positive electrode material coated on the surface of the substrate; the positive electrode material includes: 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance; and the positive electrode active material is a spherical nickel hydroxide coated with Co3+. The nickel-zinc secondary battery provided by the present invention can reduce the amount of (Continued)

hydrogen evolved and have good cycling performance while maintaining the battery capacity. The present invention further provides a method for preparing a nickel-zinc secondary battery.

11 Claims, 4 Drawing Sheets (51) Int. Cl.
| | |
|---|---|
| H01M 4/525 | (2010.01) |
| H01M 10/30 | (2006.01) |
| H01M 4/36 | (2006.01) |
| H01M 4/26 | (2006.01) |
| H01M 4/32 | (2006.01) |
| H01M 4/48 | (2010.01) |
| H01M 4/62 | (2006.01) |
| H01M 4/66 | (2006.01) |
| H01M 10/28 | (2006.01) |
| H01M 4/04 | (2006.01) |
| H01M 2/26 | (2006.01) |

(52) U.S. Cl.
CPC .............. *H01M 4/48* (2013.01); *H01M 4/622* (2013.01); *H01M 4/624* (2013.01); *H01M 4/661* (2013.01); *H01M 4/667* (2013.01); *H01M 10/286* (2013.01); *H01M 10/30* (2013.01); *H01M 2/263* (2013.01); *Y10T 29/4911* (2015.01); *Y10T 29/49115* (2015.01)

(56) References Cited

U.S. PATENT DOCUMENTS

| | | | | |
|---|---|---|---|---|
| 6,534,215 | B1* | 3/2003 | Shinyashiki | H01M 4/246 29/2 |
| 6,620,549 | B2 | 9/2003 | Nanno et al. | |
| 7,255,958 | B2* | 8/2007 | Yanagawa et al. | 429/94 |
| 7,488,557 | B2* | 2/2009 | Maeda et al. | 429/217 |
| 2007/0077489 | A1* | 4/2007 | Bernard | H01M 4/24 429/217 |
| 2009/0208839 | A1* | 8/2009 | Geng | H01M 4/32 429/223 |
| 2010/0062339 | A1* | 3/2010 | Pan et al. | 429/231.95 |
| 2010/0092857 | A1* | 4/2010 | Phillips et al. | 429/164 |

FOREIGN PATENT DOCUMENTS

| | | | |
|---|---|---|---|
| CN | 101299469 | | 11/2008 |
| CN | 101593834 | | 12/2009 |
| CN | 201556677 | * | 8/2010 |
| CN | 201556677 U | | 8/2010 |
| CN | 102263298 | | 11/2011 |
| JP | 10125318 | | 5/1998 |

OTHER PUBLICATIONS

PCT International Search Report dated Oct. 18, 2012, PCT Patent Application No. PCT/CN2012/076974.
PCT Written Opinion of the International Searching Authority dated Oct. 18, 2012, PCT Patent Application No. PCT/CN2012/076974.
English Translation of Abstract of Chinese Patent Application No. CN1503994A.
English Translation of Abstract of Chinese Patent Application No. CN101593834.
English Translation of Abstract of Chinese Patent Application No. CN201556677U.
English Translation of Abstract of Chinese Patent Application No. CN101299469.
English Translation of Abstract of Chinese Patent Application No. CN1174419.
English Translation of Abstract of Japanese Patent Application No. JP10125318.
English Translation of Abstract of Chinese Patent Application No. CN102263298.

* cited by examiner

NICKEL-ZINC SECONDARY BATTERY AND METHOD FOR PREPARING THE SAME

FIELD OF THE INVENTION

The present invention relates to a secondary battery and a method for preparing the same, and in particular, to a nickel-zinc secondary battery and a method for preparing the same.

BACKGROUND OF THE INVENTION

At present, with the issuing of increasingly strict environmental regulations by governments of due to increasingly serious environmental-protection situations, as well as obstinately high international oil prices and booming internet and electronic products, the battery market, such as hybrid electric vehicles, electric vehicles, rechargeable energy storing systems and uninterruptible power supplies for data centers, is brought to the new and rapid growth. The continuous booming of hybrid electric vehicles (HEV), pluggable hybrid electric vehicle (PHEV), and electric vehicles (EV) presses for a battery product capable of meeting the demands for high power, high energy storage, high reliability and safety, and environmental friendliness. The prevailing batteries in the past, i.e., lead-acid batteries and nickel-cadmium batteries (NiCd), can neither satisfy the demands for the development of the market, nor meet the demands for environmental protection any longer. Lithium-ion batteries are successfully applied in portable electronic devices; however, they have the disadvantages of insufficient power, high cost, and safety risk, failing to be applied in large-size systems. The newly emerging nickel-zinc batteries can meet all of the afore-mentioned demands: high power, sufficient energy (up to 4 times of that of lead-acid batteries), free from environment pollution (containing no lead, cadmium, or mercury), high reliability and safety (non-flammability), low cost, long life, and rechargeability.

A nickel-zinc battery includes a battery case, an electrode assembly, and electrolyte. The electrode assembly and the electrode are received in the battery case, and the electrode assembly includes a nickel positive electrode, a zinc negative electrode, and a membrane separator disposed between the nickel positive electrode and the zinc negative electrode. The existing nickel-zinc secondary battery normally directly adopts the nickel electrode used in a nickel-hydrogen battery or a nickel-cadmium battery, which is a flexible foil electrode formed by generally using a substrate of a nickel foil or foamed nickel, and coating the surface or inside of the substrate with positive electrode active material, that is, $Ni(OH)_2$.

During the preparing and charging/discharging process of $Ni(OH)_2$, there are always some unreduced Ni (III) ions, which are referred to as electron defects in the field of semiconductor, and some stoichiometrically excessive $O^{2-}$ ions, which are referred to as proton defects. Therefore, some amount of $OH^-$ ions in the lattice of $Ni(OH)_2$ are replaced by $O^{2-}$ ions. The conductivity of this semiconductor not only depends on the motility of the electron defects and the concentration of the electron defects in the lattice, but also on the above defects existed in the lattice. These reasons lead to poor conductivity of nickel hydroxide, as well as the phenomenon that oxygen is evolved soon after being charged, penetrated the membrane separator, and adsorbed on the negative electrode. Therefore, $Co^{2+}$ is often added to current nickel electrode to improve the conductivity of the nickel electrode, so that the reaction product $Co^{3+}$ can form an excellent conductive net between the particles of nickel hydroxide with the proceeding of charge, so as to improve the "overpotential for oxygen evolution" of the nickel electrode, reduce the resistance of the battery, delay the evolution of oxygen, and enhance charging efficiency. Similarly, it facilitates improving the discharging depth of the nickel electrode during discharging, thereby improving the discharging capacity of the battery. Additionally, it is often necessary to add $Cd^{2+}$ to $Ni(OH)_2$, so as to improve the electrolytically charging overpotential of the battery.

However, when the above nickel electrode components are used in a nickel-zinc electrode, $Co^{2+}$, which is easily dissolved in the electrolyte KOH solution, will diffuse toward the negative electrode, and is rapidly reduced on the zinc electrode, and precipitating Co on the negative electrode due to low potential for hydrogen evolution. The precipitated Co will form a hydrogen-evolving corrosive primary battery together with the zinc on the negative electrode, causing the continuous evolution of hydrogen and the soaring of the pressure in the battery, and increasing the possibility of explosion and liquid leakage in the battery, leading to large safety risk. At the same time, with the continuous consumption of the negative electrode and the fading of the capacity, the charge retention property becomes poorer. Additionally, the Cd added will cause pollution to the surrounding environment and the human body, decreasing the environmental friendliness of the battery.

SUMMARY OF THE INVENTION

The technical problem to be solved by the present invention is to provide a nickel-zinc secondary battery, which can reduce the amount of the hydrogen evolved and has good cycling performance while ensuring the capacity of the battery.

In order to solve the technical problem in the prior art, the present invention provides a nickel-zinc secondary battery, including:
  a battery case;
  an electrode assembly, disposed in the battery case;
  an electrolyte solution, positioned in the battery case, and filled around the electrode assembly,
  wherein the electrode assembly includes a nickel positive electrode, a zinc negative electrode, and a membrane separator disposed between the nickel positive electrode and the zinc negative electrode;
  the nickel positive electrode includes: a substrate and positive electrode material coated on the surface of the substrate, the positive electrode material includes: 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance; and the positive electrode active material is a spherical nickel hydroxide coated with $Co^{3+}$.

Preferably, the zinc negative electrode includes: a negative electrode substrate and a composition of the negative electrode active material coated on the negative electrode substrate.

Preferably, the negative electrode substrate includes: a first zinc foil layer; a copper foil layer compounded on the first zinc foil layer; and a second zinc foil layer compounded on the copper foil layer.

Preferably, the composition of the negative electrode active material includes:
40 wt %~60 wt % ZnO;
5 wt %~10 wt % Zn;
1.5 wt %~3.5 wt % Zn(OH)$_2$;
0.5 wt %~2 wt % Ca(OH)$_2$;
0.5 wt %~3 wt % Bi$_2$O$_3$;
0.001 wt %~0.02 wt % In(OH)$_2$;
20 wt %~30 wt % binder; and
5 wt %~40 wt % additive.

Preferably, the nickel positive electrode further includes: a locating adhesive layer coated on the lower surface of the substrate and positioned on one side of the positive electrode material, the locating adhesive layer being formed by drying an adhesive, which is a mixture of polyfluortetraethylene emulsion and hydroxypropyl methyl cellulose solution.

Preferably, the nickel-zinc secondary battery further includes:
 a cap, disposed at one end of the electrode assembly;
 a negative electrode current collecting disc, disposed between the cap and the electrode assembly; and
 a positive electrode current collecting disc, disposed at the other end of the electrode assembly;
 wherein the negative electrode current collecting disc and the positive electrode current collecting disc are locate din the battery case.

The present invention provides a method for preparing a nickel-zinc secondary battery, including:
 a) winding a nickel positive electrode, a membrane separator, a zinc negative electrode to form an electrode assembly; the membrane separator being disposed between the nickel positive electrode and the zinc negative electrode; the nickel positive electrode including: a substrate and positive electrode material coated on the surface of the substrate, the positive electrode material including: 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance; the positive electrode active material being a spherical nickel hydroxide coated with Co$^{3+}$;
 b) fixing the electrode assembly in the battery case, and filling the battery case with electrolyte solution; and
 c) packaging the battery case filled with the electrolyte solution in step b) to form a nickel-zinc secondary battery.

Preferably, step a) includes the steps of:
 a1) placing the membrane separator in a membrane positioning slot in the lower rail of a winding machine, and placing the zinc negative electrode in the negative electrode positioning slot in the lower rail of the winding machine, which is folded back after bypassing the winding needle, so that the front end of the membrane separator is overlapped with the tail end of the negative electrode;
 a2) counterclockwise rotating the winding needle so that the zinc negative electrode and the composite membrane rotate one loop together; and
 a3) placing the nickel positive electrode in the positive electrode positioning slot of the upper rail of the winding machine, and counterclockwise rotating the winding needle, while winding the membrane separator, the zinc negative electrode, and the nickel positive electrode into an electrode assembly.

Preferably, at one end of the electrode assembly, the longer side of the negative electrode substrate without being coated with the composition of the negative electrode active material extends 0.5~3 mm beyond the membrane separator, and is processed into the conductive end surface for the negative electrode; at the other end of the electrode assembly, the longer side of the positive electrode substrate coated with the positive electrode extends 0.5~3 mm beyond the membrane separator, and is processed into a conductive end surface for the positive electrode; and the outmost surface of the electrode assembly is wrapped with a layer of continuous adhesive tape which is hydrophobic, and resistant to high temperature and alkali.

Preferably, the step b) includes the steps of:
 b1) packaging the electrode assembly into a battery case having a positive electrode current-collecting disc with uniformly distributed blurs, with the positive electrode heading downward, so that the electrode assembly is fully contacted with the positive electrode current-collecting disc;
 b2) extending a shock-proof conductive metal tape from the nickel positive electrode and welding the same on the bottom of the battery case; and
 b3) filling the battery case with electrolyte solution by a weight deviation ≤0.02 g.

Preferably, the battery case is vacuumed to a vacuum of 0.15~0.5 Mpa when filling the electrolyte solution.

Preferably, step c) includes the steps of:
 c1) disposing a sealing ring at the opening the battery case, and coating a sealing adhesive on the sealing ring; and
 c2) placing a combined part formed by welding a cap and a negative electrode current-collecting disc in the sealing ring coated with the sealing adhesive, fixating, and drying to form a nickel-zinc secondary battery.

The present invention provides a nickel-zinc secondary battery, including: a battery case; an electrode assembly, disposed in the battery case; an electrolyte solution, positioned in the battery case, and filled around the electrode assembly, wherein the electrode assembly includes a nickel positive electrode, a zinc negative electrode, and a membrane separator disposed between the nickel positive electrode and the zinc negative electrode; the positive electrode includes: a substrate and positive electrode active material coated on the surface of the substrate, the positive electrode active material includes: 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance; and the positive electrode active material is a spherical nickel hydroxide coated with Co$^{3+}$. In comparison with the prior art, the positive electrode material used in the nickel-zinc secondary battery provided by the present invention contains no Co$^{2+}$ ion or Cd ion, thereby reducing the amount of hydrogen evolved from the electrode and improving the environmental friendliness of the battery. Spherical nickel hydroxide coated with Co$^{3+}$ is used as the positive electrode material to improve the charging/discharging efficiency of the electrode, and nickel powder, yttrium oxide, and calcium hydroxide are used in combination as the positive electrode additive. The nickel powder is used to improve the discharging depth of the nickel electrode, catalyze the compounding of hydrogen and oxygen, and decrease the amount of hydrogen evolved; and the yttrium oxide and the calcium hydroxide are used to further improve the oxygen overpotential and the discharging depth of the electrode. Therefore, the positive electrode prepared from the positive electrode material provided by the invention can reduce the amount of hydrogen evolved in the battery while ensuring relatively high electrode charging/discharging capacity, thereby improving the use life and safety of the nickel-zinc electrode.

DETAILED DESCRIPTION

For a better understanding of the present invention, preferred embodiments of the present invention are described in conjunction with the embodiments. However, it should be noted that these descriptions are made for further describing the characteristics and advantages of the present invention, rather than limiting the scopes of the claims of the present invention.

The present invention provides a nickel-zinc secondary battery, including:
- a battery case;
- an electrode assembly, disposed in the battery case;
- an electrolyte solution, positioned in the battery case, and filled around the electrode assembly;
- wherein the electrode assembly includes a nickel positive electrode, a zinc negative electrode, and a membrane separator disposed between the nickel positive electrode and the zinc negative electrode;
- the nickel positive electrode includes: a substrate and positive electrode material coated on the surface of the substrate, the positive electrode material includes: 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance; and the positive electrode active material is a spherical nickel hydroxide coated with $Co^{3+}$.

Figure 1:
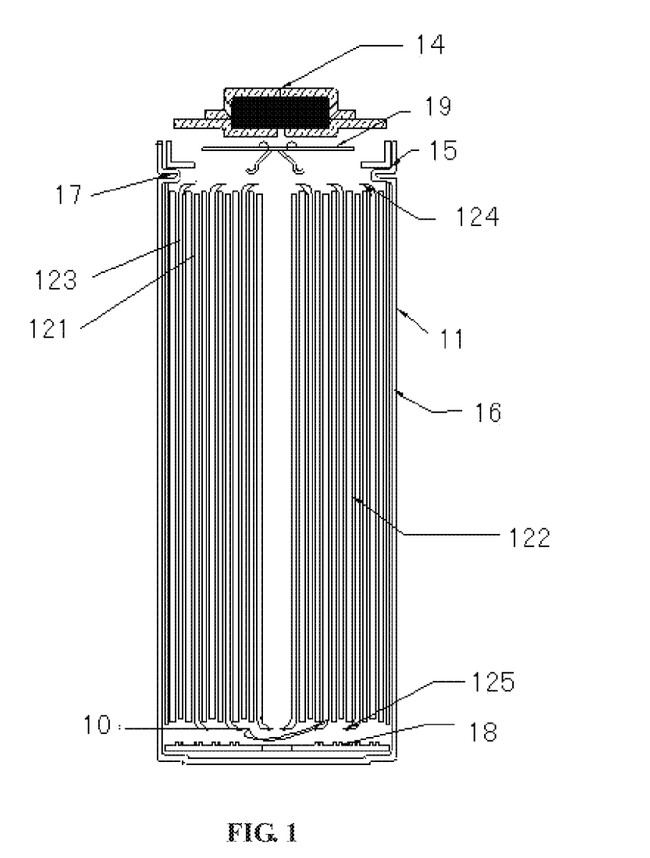
FIG. 1 is a structural diagram of a nickel-zinc secondary battery provided by the present invention.

The nickel-zinc secondary battery provided by the present invent has the structure shown in FIG. 1, including: a battery case 11, an electrode assembly 12, and an electrolyte solution 13. The electrode assembly includes a positive electrode 121, a membrane separator 122, and a zinc negative electrode 123.

The battery case of the nickel-zinc secondary battery provided by the present invention is made of metal, especially, steel plated with nickel, for example, of a steel plate processed by pressing, stretching, and then plated by nickel. The steel case is preferably cylindrical, cuboid-shaped, or other three-dimensional shape, and more preferably cylindrical. It has a thickness of 0.1-0.5 mm, and is plated with a nickel layer having a thickness of 2-10 μm. The density of the nickel layer meets the conditions of blue points ≤3 $PCS/cm^2$ during blue point test, which is performed by applying a corrosive solution prepared from $K_3Fe(CN)_6$: $NaCl:H_2O=17:3:80$ on the nickel layer, standing for 45 minutes, and then counting the blue points appeared thereon.

The nickel-zinc battery uses the battery case made of steel as the positive electrode terminal, and the anti-liquid-leakage cap disposed at the sealing as the negative electrode terminal. The conductive end surface 124 of the zinc negative electrode is connected with the negative electrode current-collecting disc 19, which is disposed between the cap and the electrode assembly, and is preferably prepared by beryllium bronze plated with tin.

In the prior art, a method involves producing a Zn electrode shorter than the positive electrode, so that the positive electrode can completely surround the Zn electrode at the outer periphery of the electrode assembly upon winding and is contacted with the steel container. However, such method will greatly reduce the specific surface area of the negative electrode, and increase area/current ratio, failing to operate under large current, and in turn leading to the passivation and deactivation of the Zn electrode. In addition, due to too small specific surface area of the negative electrode, the $O_2$ evolved at the nickel electrode in the latter stage of charging can not be rapidly adsorbed on the Zn electrode, and on the contrary, leads to increased internal pressure in the battery, resulting high safety risk. In a nickel-zinc battery, improving current balance is one of the key measures to reduce the deformation of the negative electrode, and prevent the growth of dendrites.

The secondary nickel-zinc battery includes an anti-liquid-leakage cap 14, which includes an upper subassembly made of steel plated with nickel (the surface of steel is first plated with copper, and then with nickel) having one or more ventilation holes therein and a lower subassembly processed from the composite material of steel and pure copper. The steel surface of the lower subassembly is sequentially plated with copper, tin, and nickel. It has a ventilation hole right in the middle to ensure the safety of the battery. A cylindrical alkali-resistant nitrile rubber valve is disposed between the upper and lower subassembly, serving to discharge gas when the internal pressure of the battery is excessive. One copper surface of the lower subassembly of the cap is coated with a custom-made alkali resistant, hydrophobic, air permeable, catalyzing coating.

The nickel-zinc battery includes a round sealing ring 15 made of nylon 66 and disposed on the groove 17 of the battery case, primarily serving to isolate the nickel positive electrode and the zinc negative electrode, and acting as the sealing between the steel container and the anti-liquid-leakage cap to prevent the electrolyte from leaking.

The nickel-zinc battery includes a hydrophobic, high-temperature resistant, alkali-resistant continuous adhesive tape 16 made from PP or PE material, which has a thickness of 0.01-0.5 mm, and is resistant to degradation and deformation when being soaked in 30% KOH solution at 60° C. for 24 hours. The adhesive tape mainly serves to isolate the steel case from the negative electrode at the outer periphery of the electrode assembly to prevent a short circuit.

According to the present invention, at the other end of the electrode assembly is disposed a positive electrode current-collecting disc 18, which preferably includes blurs uniformly distributed on the bottom of the battery case. The blurs is fully contacted with the positive electrode conductive end surface 125 formed by the nickel positive electrode. The positive electrode conductive end surface is welded on the bottom of the battery case via a shock-proof conductive metal tape 10.

In comparison with the prior art, the embodiments of the present invention discloses a positive electrode material for a nickel-zinc secondary battery, including: 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance, wherein the positive electrode active material is a spherical nickel hydroxide coated with $Co^{3+}$.

The positive electrode material provided by the present invention uses a spherical nickel hydroxide coated with $Co^{3+}$ as the positive electrode active material, and the mixture of yttrium oxide ($Y_2O_3$), Calcium hydroxide (Ca$(OH)_2$), and nickel powder as the positive electrode additive. The spherical nickel hydroxide coated with $Co^{3+}$ is formed by coating the surface of spherical nickel hydroxide with $Co^{3+}$ compound, for example, coating $Ni(OH)_2 5.0$ with $Zn3.35Co1.35$, that is, coating the surface of spherical nickel hydroxide with 3.35 wt % zinc oxide and 1.35 wt % $Co^{3+}$. The spherical nickel hydroxide coated with $Co^{3+}$ is preferably Model Y6 $Co^{3+}$ provided by Jintian Energy Material Co., Ltd.

Due to the good conductivity of $Co^{3+}$, coating spherical nickel hydroxide with $Co^{3+}$ can improve the utilization ratio of the positive electrode active material, and in turn greatly improve the charging/discharging efficiency of the nickel electrode; and at the same time inhibit the evolution of oxygen during charging. It is important that $Co^{3+}$ is not dissolved in KOH solution and will not impose adverse effect on Zn electrode. The spherical nickel hydroxide coated with $Co^{3+}$ preferably has a particle size of 280 mesh to 320 mesh, and more preferably 200 mesh.

A positive electrode additive is used to aid the positive electrode active material in improving the oxygen overpotential and discharging depth of the electrode. Since nickel powder has good conductivity, the adding of nickel can increase the conductivity of nickel hydroxide on one hand, and facilitate the nickel electrode in improving the discharging depth, thereby significantly improve the discharging capacity of the battery. Additionally, the nickel powder acts as a catalyst in the battery. The experimental results shows that nickel powder can substantially enhance the compounding of hydrogen and oxygen at a temperature range of 25~50° C., thereby greatly reducing the internal pressure of the battery and ensuring the safety of the battery during use. Therefore, the nickel powder plays a role of conducting current, increasing the discharging depth, and catalyzing the compounding of hydrogen and oxygen. The nickel powder has a particle size of preferably 50 mesh to 70 mesh, and more preferably 60 mesh.

In addition to the nickel powder, 0.2 wt %~0.6 wt % Ca$(OH)_2$ and 0.6 wt %~1 wt % $Y_2O_3$ are added in the positive electrode in combination with the nickel powder. The Ca$(OH)_2$ play the following roles: firstly, improving the oxygen evolution overpotential of the nickel electrode, and enhancing the charging/discharging efficiency of the battery by inhibiting the swelling of the nickel electrode and the evolution of oxygen during charging, especially the charging efficiency of the battery at 30° C.~90° C., so that the battery has a broader operating range; and secondly, improving the diffusing speed of protons by changing the structure of the active material, and in turn increasing the utilization ratio of the active material as well as the discharging potential of the electrode, since the calcium on the surface of the positive electrode active particles during charging/discharging process of the nickel electrode will be partially dissolved in the lattice of the active material. The calcium hydroxide preferably has a particle size of 70 mesh to 90 mesh. $Y_2O_3$ plays a similar role in the battery system as that of the calcium, that is, further improving the oxygen overpotential and the discharging depth of the electrode. It preferably has a particle size of 90 mesh to 120 mesh.

In the positive electrode material, the binder plays a role of carrying the above solid material and tightly binding them with the base tape. In the present invention, the binder is preferably the mixture of polyfluortetraethylene (PTFE) emulsion and Hydroxymethyl cellulose (CMC) solution, or the mixture of polyfluortetraethylene and Hydroxypropyl methyl cellulose (HPMC) solution. More preferably, the PTFE emulsion has a concentration of 50 wt %~70 wt %, and the composite binder has a relatively high binding strength, and thus can greatly inhibit the swelling and falling off of the positive electrode material.

It can be seen from the above technical solution that the positive electrode material provide by the present invention contains no $Co^{2+}$ ions and cadmium ions, thereby reducing the amount of hydrogen evolved from the electrode, and improving the environmental friendliness of the battery; using the spherical nickel hydroxide coated with $Co^{3+}$ as the positive electrode improves the charging/discharging efficiency of the electrode; and in the combined use of nickel powder, yttrium oxide, and calcium hydroxide as the positive electrode additive, the nickel powder is used to improve the discharging depth of the nickel electrode, catalyzing the compounding of hydrogen and oxygen, and reducing the amount of hydrogen evolved; and the yttrium oxide, and calcium hydroxide are used to further improve the oxygen overpotential and discharging depth of the electrode. therefore, the positive electrode prepared from the positive electrode material provide by the present invention can improve the use life and safety of the nickel-zinc battery while ensuring higher charging/discharging capacity of the electrode and reducing the amount of hydrogen evolved in the battery.

The above positive electrode material can be prepared by the steps of:

S1) uniformly mixing the above positive electrode active material, yttrium oxide, calcium hydroxide, and the nickel powder according to their weight ratio; and S2) uniformly agitating the mixture obtained in step S1) with a binder to provide the above positive electrode material for a nickel-zinc secondary battery.

The present invention further provides a positive electrode for nickel-zinc secondary battery including a base tape and a positive electrode material coated on the surface of the base tape, wherein the positive electrode material includes: 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance, and the positive electrode active material is a spherical nickel hydroxide coated with $Co^{3+}$.

The positive electrode for a nickel-zinc secondary battery provided by the present invention adopts the above positive electrode material containing no $Co^{2+}$ ions and cadmium ions, thereby reducing the amount of hydrogen evolved from the electrode, and improving the environmental friendliness of the battery; using the spherical nickel hydroxide coated with $Co^{3+}$ as the positive electrode improves the charging/discharging efficiency of the electrode; and in the combined use of nickel powder, yttrium oxide, and calcium hydroxide as the positive electrode additive, the nickel powder is used to improve the discharging depth of the nickel electrode, catalyzing the compounding of hydrogen and oxygen, and reducing the amount of hydrogen evolved; and the yttrium oxide, and calcium hydroxide are used to further improve the oxygen overpotential and discharging depth of the electrode. therefore, the positive electrode prepared from the positive electrode material provide by the present invention can improve the use life and safety of the nickel-zinc battery while ensuring higher charging/discharging capacity of the electrode and reducing the amount of hydrogen evolved in the battery.

The base tape used in the above positive electrode for a nickel-zinc secondary battery is a foamed nickel base tape known by those skilled in the art. The present invention adopts a continuous porous nickel base tape having an areal density of 300~520 g/cm$^2$, so as to ensure continuous and efficient production of the electrode plate and consistent quality, as well as the flexibility of the electrode plate. The positive electrode material can be wet or dry coated onto the surface of the base tape.

Figure 3:
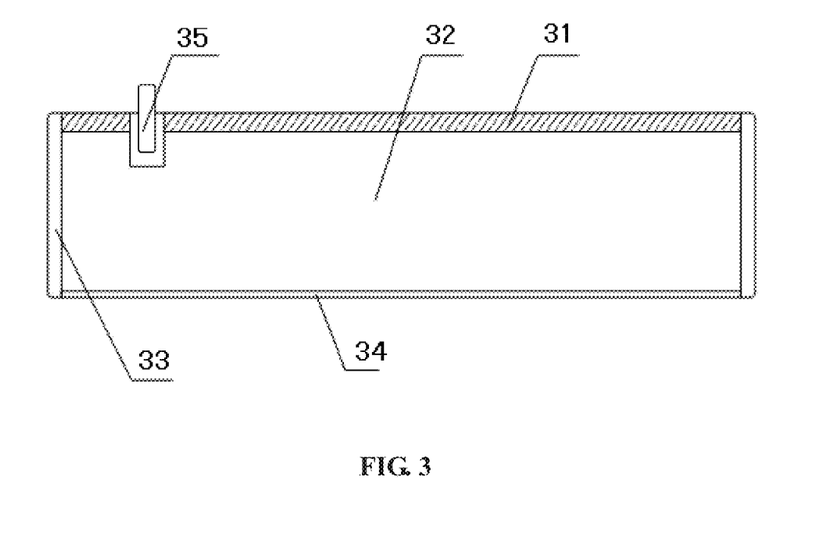
FIG. 3 is a structural diagram of a positive electrode in the nickel-zinc secondary battery provided by the present invention.

FIG. 3 shows a structural diagram of the positive electrode for a nickel-zinc secondary battery provided by the present invention, which includes:

a tape and the above positive electrode material 32 coated on the surface of the tape, the upper side of the base tape without being coated with the positive electrode material forming a current collecting tape 31;

an air permeable membrane 33 wrapped on the coiling head end and the coiling tail end of the base tape;

a locating adhesive layer 34 coated on the lower surface of the base tape and positioned on the side having the positive electrode material;

a conductive, shock-proof nickel metal sheet 35 welded on the surface of the base tape.

The current collecting tape 31 in the above positive electrode is a exposed nickel edge, which provides an area having excellent performance, and capable of decreasing the moving distance of electrons and reducing resistance on the base tape for dispersing and conducting current, thereby avoiding producing large amount of heat when current passes.

During use, the positive electrode plate needs to be coiled, which starts from the starting end, that is, the coiling head end, and ends at the coiling tail end. In the embodiments of the present invention, the head end and the tail end of the base tape are wrapped with an air permeable membrane, so as to prevent the nickel fiber blurs exposed from the coiling head end and the tail end of the positive electrode plate from piercing the membrane separator of the positive or negative electrodes during processing or using the battery, thus preventing the battery from failing and prolong the use life thereof. The air permeable membrane is preferably polypropylene grafted air permeable membrane, for example, the polypropylene grafted air permeable membranes sold under the trade name MPMD6015 by Mitsubishi Corporation.

The locating adhesive layer 34 is formed by drying an adhesive, which is the mixture of polyfluortetraethylene emulsion and Hydroxypropyl methyl cellulose solution. The adhesive has a high adhering strength with the base tape. Since the positive electrode material tends to fall into the electrolyte solution after deformation and cause safe risk to the battery, the locating adhesive layer is arranged on the positive electrode material side of the base tape, so as to inhibit the deformation of the positive electrode material, and prevent the same from dropping into the electrolyte solution, thus improving the reliability of the battery. The polyfluortetraethylene emulsion and hydroxypropyl methyl cellulose solution in the adhesive has a weight ratio of preferably 1:4~6. The polyfluortetraethylene emulsion has a concentration of 55 wt %~65 wt %, and the hydroxypropyl methyl cellulose solution has a concentration of 0.5~0.8 wt %. The locating adhesive layer has a width of preferably 1.5 mm~2.5 mm.

The conductive, shock-proof nickel metal sheet 35 is used to improve the shock-proof property of the battery during use, the applicability of the battery in harsh environment, and the stable reliability of the battery when the electronic devices are subjected to continuous and intense vibration. The conductive, shock-proof nickel metal sheet preferably has a width of 0.01 mm~0.03 mm.

Correspondingly, the present invention further provides a method for preparing the positive electrode for the above nickel-zinc secondary battery according, including:

D1) coating a base tape with a positive material including 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance; the positive electrode active material is a spherical nickel hydroxide coated with $Co^{3+}$; and D2) sequentially subjecting the base tape obtained in step D1) to drying, rolling, and cutting to provide a positive electrode for the nickel-zinc secondary battery.

Step D1) is a process for coating the positive electrode material on the surface of the positive electrode. The tape coated with the positive electrode in step D1) needs to be dried at a temperature of preferably 70° C.~120° C. Then, the formed nickel metal sheets are rolled into a certain thickness so as to meet the demands for assembling and coiling. The rolled foamed nickel metal sheets are cleared of the positive electrode material attached on the beading sites on both edges, and then subjected to rolling again for cutting. Upon cutting, preferably, the four right-angle corners of the base tape are trimmed into arc corners of 135°~150°, so as to avoid damaging the membrane separator of the battery.

For the convenience of coiling the positive electrode, in the present invention, the positive electrode obtained by cutting are preferably softened through a kneading machine.

For the purpose of better understanding the present invention, the positive electrode material for the nickel-zinc secondary battery and the nickel-zinc secondary battery provided by the present invention are described in combination with the embodiments given below. However, the scope of protection of the present invention is not limited by the following embodiments.

The foamed nickel base tapes used in the following embodiments are all purchased from SHANDONG HEZE Corp., type 320-400 g/m$^2$.

The spherical nickel hydroxides coated with Co3+ are all purchased from Jintian Energy Material Co., Ltd, model Y6.

The polypropylene grafted air permeable membranes are all purchased from Mitsubishi Corporation, model MPMD6015.

Embodiment 1

Preparing the positive electrode material having the following components:

The spherical nickel hydroxide coated with $Co^{3+}$: 68.2 wt %

Nickel powder: 3.8 wt %

$Ca(OH)_2$: 0.4 wt %

$Y_2O_3$: 0.8 wt %

CMC glue having a concentration of 0.8 wt %: 26 wt %

PTFE emulsion having a concentration of 60 wt %: 0.8 wt %

The preparing method includes the steps of:

1. weighing the spherical nickel hydroxide coated with $Co^{3+}$ according to the above weight percentage, and screening through a 300 mesh sieve once; weighing $Y_2O_3$ according the weight percentage and screening through a 100 mesh sieve once; weighing $Ca(OH)_2$ according to the above weight percentage, and screening through a 80 mesh sieve once; and weighing nickel powder according to the above weight percentage, and screening through a 60 mesh sieve once;

2. loading the spherical nickel hydroxide coated with $Co^{3+}$, $Y_2O_3$, $Ca(OH)_2$ and nickel powder by increment into a 75 L conical double-spindle powder mixer for mechanical coating and mixing purpose. The motor speed is set at 1.5 rad/1 s. when the coated material passes through the dual spindles for processing, the dual spindle mixer are respectively rotated at 129 rad/1 s toward opposite directions, while rotating counterclockwise as a whole at 7 rad/1 s for 45 minutes to homogenize the active materials and addictives, which are then stored and sealed in a plastic container for use.

3. weighing prepared 0.8% CMC glue according to the weight ratio, and loading into the tank in a vacuum mixer. The positive electrode powders obtained step 2 are added individually and mixed as follow:

3a. weighing 25 wt % positive electrode powder, and loading into the tank of a vacuum mixer. The rotating speed of the vacuum mixer is set at 70 rad/1 s, the rotating speed of the disperser in the mixer is set at 350 rad/1 s and the mixing time is set for 23 min. Upon the mixing, the vacuum valve is opened, the vacuum is set at −0.15 aPM, and the time is set for 10 min;

3b. weighing 40% positive electrode powder, and loading into the tank of a vacuum mixer. The rotating speed of the vacuum mixer is set at 50 rad/1 s, the rotating speed of the disperser in the mixer is set at 170 rad/1 s and the mixing time is set for 15 min. the mixer and the disperser are started at the same time to start mixing. Upon the mixing, the vacuum valve is opened, the vacuum is set at −0.1 aPM, and the time is set for 10 min;

3c. weighing 40% positive electrode powder, and 60% PTFE emulsion according to the weight ratio, and loading them into the tank of a vacuum mixer. The rotating speed of the vacuum mixer is set at 47 rad/1 s, the rotating speed of the disperser in the mixer is set at 400 rad/1 s and the mixing time is set for 45 min. Upon the mixing, the vacuum valve is opened, the vacuum is set at −0.1 aPM, and the time is set for 10 min, so as to prepare the positive electrode material.

Embodiment 2 to Embodiment 4

The positive electrode material in the three embodiments is prepared in the same procedure as in embodiment 1, and the components of the positive electrode are list in table 1 below.

TABLE 1

Components of positive electrode material

| | Components of the positive electrode |
|---|---|
| Embodiment 2 | spherical nickel hydroxide coated with $Co^{3+}$: 68.5 wt % <br> Nickel powder: 3.6 wt % <br> $Ca(OH)_2$: 0.4 wt % <br> $Y_2O_3$: 0.7 wt % <br> CMC glue having a concentration of 0.8 wt %: 26 wt % <br> PTFE emulsion having a concentration of 60 wt %: 0.8 wt % |

TABLE 1-continued

Components of positive electrode material

| | Components of the positive electrode |
|---|---|
| Embodiment 3 | spherical nickel hydroxide coated with $Co^{3+}$: 68.8 wt % <br> Nickel powder: 3.8 wt % <br> $Ca(OH)_2$: 0.3 wt % <br> $Y_2O_3$: 0.9 wt % <br> CMC glue having a concentration of 0.8 wt %: 26 wt % <br> PTFE emulsion having a concentration of 60 wt %: 0.5 wt % |
| Embodiment 4 | spherical nickel hydroxide coated with $Co^{3+}$: 68.4 wt % <br> Nickel powder: 3.6 wt % <br> $Ca(OH)_2$: 0.5 wt % <br> $Y_2O_3$: 0.7 wt % <br> CMC glue having a concentration of 0.8 wt %: 26 wt % <br> PTFE emulsion having a concentration of 60 wt %: 0.8 wt % |

Embodiment 5

1. The foamed nickel base tape is pre-pressed, and passed a constant-temperature material tank with an agitator, in which the positive electrode material prepared according to Embodiment 1 is contained. The slurry of the positive electrode material is uniformly coated on the foamed base tape under constant temperature and continuous agitation. The excessive slurry attached on the foamed nickel base tape is removed by a scraper blade.

2. The coated foamed nickel base tape sequentially passes the drying chambers of 78° C., 100° C., and 117° C., so that the dried base tape contains 7%~9% $H_2O$, ensuring good flexibility of the positive electrode plate, and preventing the positive electrode plate from breaking during coiling.

3. The foamed porous nickel positive electrode obtained in step 2 is passed through a vertical rolling device having a diameter of ϕ400-500 mm, a length of 500-600 mm, and a liquid-air pressure adjusting controlling. The rolled continuous foamed nickel base tape is passed through an automatic ultrasonic cleaning device, so as to clear of the positive electrode material attached on the beading sites on both edges.

4. The rolled positive electrode continuously strip-like foamed nickel base tape is passed through an automatic slicer to longitudinally slice the continuous foamed nickel base tape to a length required the process, the semi-finished product is passed through an automatic slice separator and horizontally cut along the width of the plates, and the four corner of the cut positive electrode plate are trimmed into arc corners of 135-150°;

5. The positive electrode plates obtained in step 4 are dipped in an adhesive, which is the mixture of 0.6 wt % HPMC binder and 60 wt % PTEE emulsion in a weight ratio of 100:20, until a 2 mm width of the plates is obtained. Then the dipped plates are baked at 60° C. for 5 min.

6. The plates obtained in step 5 are softened in a continuous kneading machine.

7. The plates obtained in step 6 are passed through a horizontal rolling device having a ϕ of 200-300 mm, and a length of 500 mm, so as to flatten the protruded nickel metal fiber at the periphery of the plates. The gap between the rollers is adjusted to be 0.01 mm thinner than the thickness of the plates.

8. the coiling head end and the tail end of the positive electrode plate are coated with 0.8 wt % HPMC glue, with the coating width being no more than 3 mm. Then small pieces of polypropylene grafted air permeable membrane are wrapped on the coiling head end and the tail end of the positive electrode plate, which are dried at 60° C. for 5 min.

9. At the edge of the uncoated side of the plate, an area for receiving the shock-proof metal sheet is cleaned by an ultrosonic cleaner, on which a pure nickel metal sheet having a thickness of 0.02 mm is weld by a reserve energy welding machine. The surface of the welding site is covered by an alkali resistant, high-temperature resistant, and insulate PP membrane, so as to prevent needle-like hard object from piercing the membrane separator, and failing the battery. A positive electrode for a nickel-zinc secondary battery is thus obtained.

10. The obtained plates are individually weighed on an electronic balance having a division value of 0.005 g and a weighing range of 500 g, and classifying the plates by a division value of 0.1 g. The classified plates are individually loaded into plastic pouches of 0.3 mm thick, vacuum packaged on a vacuum package machine, and stored at room temperature and a humidity of ≤60%, away from light.

Embodiments 6-8

The positive electrode for a nickel-zinc secondary battery in the three embodiments is prepared by the same procedure as in Embodiment 5, except that, in step 1, the positive electrode material prepared according to Embodiments 2-4 are individually contained in the material tanks, that is, Embodiments 6-8 respectively use the foamed nickel base tape coated with the positive electrode materials prepared according to Embodiments 2-4.

The positive electrode for a nickel-zinc secondary battery, the membrane separator layer, and the zinc negative electrode prepared in Embodiments 5-9 are wound into an electrode assembly by a winder, which is then placed in a sc-type steel battery case with one open end. The battery case is filled with electrolyte solution, and sealed to provide sc-type cylindrical nickel-zinc secondary battery, sequentially numbered BT-1a, BT-1b, BT-1c, and BT-1d. These batteries are tested for the internal resistance, the discharging capacity, and the gas swelling. The results are shown in the table 2 below.

TABLE 2 results for the cycling performance of the battery under 1 C

| Initial capacity (mAh) | Cycling number | Remaining capacity (mAh) | Percentage of remaining capacity (%) |
|---|---|---|---|
| 19043 | 50 | 18953 | 99.53 |
| | 100 | 18820 | 98.9 |
| | 150 | 19620 | 97.8 |
| | 200 | 18368 | 96.5 |
| | 250 | 18167 | 95.405 |
| | 300 | 17964 | 94.33 |
| | 350 | 17773 | 93.0 |
| | 400 | 17569 | 92.3 |
| | 450 | 17368 | 91 |
| | 500 | 17196 | 90 |

It can be seen from the above results that the positive electrode prepared from the positive electrode material provided by the present invention has low amount of hydrogen evolved, high discharging capacity, and excellent cycling performance.

The present invention further provides a tilted-mesh negative electrode substrate for a nickel-zinc battery, including:
a first zinc foil layer;
a first copper foil layer compounded on the first zinc foil layer; and
a second zinc foil layer compounded on the copper foil layer.

The negative electrode substrate provided by the present invention is a tilted-mesh substrate, a metal material having a structure of zinc foil/copper foil/zinc foil.

The tilted-mesh substrate includes a first zinc foil layer made of pure zinc foil, preferably 0# zinc foil. The first zinc foil layer has a thickness of preferably 0.03 mm~0.07 mm, and more preferably 0.05 mm.

A copper foil layer made of pure copper, preferably T2 pure copper, is compounded on the first zinc foil layer. The copper foil layer has a thickness of preferably 0.03 mm~0.07 mm, and more preferably 0.05 mm.

A second zinc foil layer made of pure zinc foil, preferably 0# zinc foil, is compounded on the copper foil layer. The second zinc foil layer has a thickness of preferably 0.03 mm~0.07 mm, and more preferably 0.05 mm.

Figure 4:
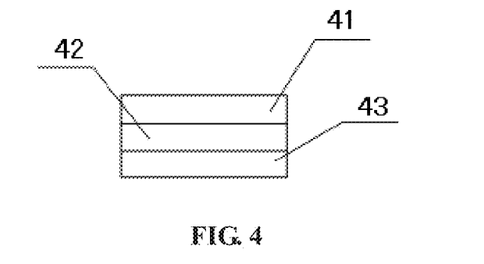
FIG. 4 is a cross sectional view of a structural diagram of a tilted-mesh negative electrode substrate provided by an embodiment of the present invention.

The tilted-mesh negative electrode substrate provided by the present invention adopts a metal material having a structure of aluminium foil/copper foil/aluminium foil. Reference is made to FIG. 4, which shows the schematically

TABLE 2 results for the internal resistance, the discharging capacity, and the gas swelling of the batteries

| No. | Height of the batteries (mm) | Charging internal resistance (mΩ) | Discharging capacity (mAh) | Discharging internal resistance (mΩ) | Height after formation (mm) | Height difference (mm) |
|---|---|---|---|---|---|---|
| BT-1a | 42.26 | 4.6 | 2107 | 6.2 | 42.27 | 0.01 |
| BT-1b | 42.23 | 4.3 | 2017 | 6.5 | 42.24 | 0.01 |
| BT-1c | 42.24 | 4.4 | 2013 | 6.5 | 42.25 | 0.01 |
| BT-1d | 42.25 | 4.3 | 2010 | 6.2 | 42.26 | 0.01 |

The positive electrode for a nickel-zinc secondary battery, the membrane separator layer, and the zinc negative electrode prepared in Embodiment 5 are wound into an electrode assembly by a winder, which is then placed in a M-type-19AH steel battery case with one open end. The battery case is filled with electrolyte solution, and sealed to provide M-type-19AH cylindrical nickel-zinc secondary battery. The battery is tested for the cycling characteristics under 1C. The results are shown in the table 2 below.

structure sectional view of the tilted-mesh negative electrode substrate provided in a embodiment of the present invention, in which the substrate includes a first aluminium foil layer 41, a second copper foil layer 42 compounded on the first aluminium foil layer 41, and a second aluminium foil layer 41 compounded on the second copper foil layer 42.

Figure 5:
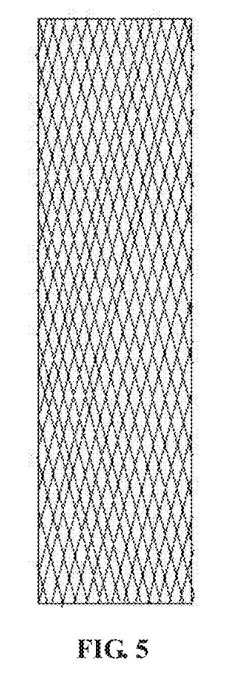
FIG. 5 is a top view of a structural diagram of a tilted-mesh negative electrode substrate provided by an embodiment of the present invention.

The tilted-mesh substrate provided by the present invention has tilted-mesh structure. Reference is made to FIG. 5, which shows the schematically structure top view of the tilted-mesh negative electrode substrate provided in the embodiment of the present invention. The tilted-mesh substrate has an areal density of preferably 260 g/m²~600 g/m², and more preferably 300 g/m²~500 g/m².

The shape of the tilted-mesh negative electrode substrate is not particularly limited in the present invention, and can be any of the shapes of the negative electrode known by those skilled in the art. It preferably has the following shape, including:
  a bottom plate of the negative electrode substrate;
  protrusions symmetrically arranged on both sides of the bottom plate of the negative electrode substrate; and
  a groove positioned in the middle of the bottom plate of the negative electrode substrate.

Figure 6:
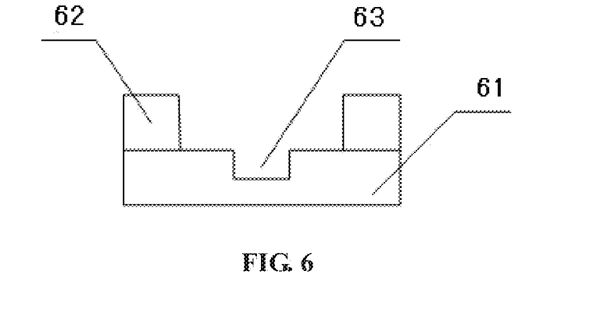
FIG. 6 is a structural diagram of a tilted-mesh negative electrode substrate provided by an embodiment of the present invention.

Reference is made to FIG. 6, which shows the schematically structural view of the tilted-mesh negative electrode substrate provided in the example of the present invention. The substrate includes a bottom plate 61 of the negative electrode substrate, protrusions 62 formed by folding and flattening both sides of the bottom plate of the negative electrode substrate, and groove 63 positioned on the bottom plate of the negative electrode substrate.

The bottom plate 61 of the negative electrode substrate adopts composite metal plate. In order to decrease the influence of the metal fiber on the electrode, both sides of the bottom plate 61 of the negative electrode substrate are folded and flattened to form protrusions 62, which has a width of preferably 3 mm~12 mm, and more preferably 5 mm~10 mm.

For the purpose of increasing the contact area between the negative electrode active material and the negative electrode substrate, grooves can be pressed in the middle of the bottom plate 61 of the negative electrode substrate 61, which has a width of preferably 3 mm~12 mm, and more preferably 5 mm~10 mm; and a depth of preferably 0.1 mm~0.3 mm, and more preferably 0.15 mm~0.25 mm.

The negative electrode substrate provided by the present invention is preferably prepared by the following steps:
  the first zinc foil, the copper foil, and the second zinc foil are respectively subjected to surface degreasing, derusting, drying, and compounding in a metal laminator to provide a compounded metal tape of first zinc foil layer/copper foil layer/the second zinc foil layer;
  the compounded metal tape is punched to provide a tilted-mesh metal tape; and
  the tilted-mesh metal tape is processed to provide a tilted-mesh negative electrode substrate.

Using a zinc foil tape and a copper foil tape as the raw material, the present invention first subjects the surface of the zinc foil tape and the copper foil tape to degreasing, derusting, cleaning, and drying, and then compounding them in a metal laminator in the order of zinc foil/copper foil/zinc foil, to provide a compounded metal tape having a structure of first zinc foil layer/copper foil layer/second zinc foil layer. In the present invention, the metal laminator is a metal compounding machine having a heating device and a rolling device, in which the first zinc foil, the copper foil, and the second zinc foil are compounded under heating and rolling to provide a compounded metal tape. The compounding is preferably performed under nitrogen so as to prevent the surface of the metal from being oxidized. The temperature for compounding is preferably 400° C.~500° C., and more preferably 400° C.~450° C.

Upon compounding, the compounded metal tape is punched in a metal cutting machine to provide a tilted-mesh metal tape. In the present invention, the metal cutting device refers to a machine having the functions of punching and cutting so that the metal can be processed into mesh structure. The tilted-mesh metal tape has an areal density of preferably 260 g/m²~600 g/m², and more preferably 300 g/m²~500 g/m².

The tilted-mesh metal tape is processed according to the desired shape of the negative electrode substrate to provide a tilted-mesh negative electrode substrate. For example, the tilted-mesh negative electrode substrate shown in FIG. 6 can be obtained by the following steps:

The opposite sides of the tilted-mesh metal tape are symmetrically folded toward the middle, and flattened to form protrusions having a width of preferably 3 mm~12 mm, and more preferably 5 mm~10 mm.

Grooves are pressed in the middle of the tilted-mesh metal tape, which have a width of preferably 3 mm~12 mm, and more preferably 5 mm~10 mm; and a depth of preferably 0.1 mm~0.3 mm, and more preferably 0.15 mm~0.25 mm.

In the tilted-mesh negative electrode substrate according to the present invention, the surface of zinc eliminates the needs for plating other metal, avoiding the incorporation of impurities. With the use of the nickel-zinc battery, part of the zinc on the surface of the tilted-mesh negative electrode substrate can participate in the reaction of forming a current, reducing the fading speed of the battery capacity; and part of the zinc is oxidized to zinc oxide, acting as a conductor to improve the utilization ratio of the negative electrode active material. When the zinc layer on the surface of the negative electrode substrate participate in the reaction or is oxidized, the copper foil layer can act as the negative electrode substrate, so as to improve the performance of the nickel-zinc battery. Moreover, the tilted-mesh negative electrode substrate provided by the present invention has a mesh structure, in which the negative electrode active material can be inserted, so that the deformation of the negative electrode and the migration of the negative electrode active material can be inhibited during the use of the battery. At the same time, the mesh structure can increase the contact area between the negative electrode substrate ad the negative electrode active material, improve the utilization ratio of the negative electrode active material, and reduce the electrode surface area/current density ratio, thereby delaying the deactivation of the negative electrode and improving the operating effect of the nickel-zinc battery under high operating current.

The present invention further provides a composition of zinc negative active material for a nickel-zinc battery, including:
  40 wt %~60 wt % ZnO;
  5 wt %~10 wt % Zn;
  1.5 wt %~3.5 wt % $Zn(OH)_2$;
  0.5 wt %~2 wt % $Ca(OH)_2$;
  0.5 wt %~3 wt % $Bi_2O_3$;
  0.001 wt %~0.02 wt % $In(OH)_2$;
  20 wt %~30 wt % binder; and
  5 wt %~40 wt % additive.

The composition of the negative electrode active material for a nickel-zinc battery provided by the present invention includes zinc oxide, which has a content of 40 wt %~60 wt %, and more preferably 45 wt %~55 wt %. the particles size of the zinc oxide is not particularly limited in the present invention, as long as they are known by those skilled in the art and can be used for a nickel-zinc battery.

The composition of the negative electrode active material for a nickel-zinc battery further includes Zn powder, which has a content of 5 wt %~10 wt %, and more preferably 6 wt %~8 wt %. the Zn is preferably nano-Zn, which has a particle size of preferably 100 nm~500 nm.

The composition of the negative electrode active material for a nickel-zinc battery further includes $Zn(OH)_2$, which has a content of 1.5 wt %~3.5 wt %, and more preferably 2 wt %~3 wt %.

The composition of the negative electrode active material for a nickel-zinc battery further includes $Ca(OH)_2$, which has a content of 0.5 wt %~2 wt %, and preferably 1 wt %~1.5 wt %. The $Ca(OH)_2$ can form calcium salt and reduce the deformation of the negative electrode.

The composition of the negative electrode active material for a nickel-zinc battery further includes $Bi_2O_3$, which has a content of 0.5 wt %~3 wt %, and preferably 1 wt %~2 wt %. The $Bi_2O_3$ has relatively high hydrogen evolution overpotential, and thus can decrease the corrosion to the electrode.

The composition of the negative electrode active material for a nickel-zinc battery further includes $In(OH)_2$, which has a content of 0.001 wt %~0.002 wt %, and preferably 0.005 wt %~0.01 wt %. The $In(OH)_2$ has a relatively high hydrogen evolution overpotential, and thus can decrease the corrosion to the electrode, thereby reducing the deformation of the electrode.

The composition of the negative electrode active material for a nickel-zinc battery further includes a binder, which has a content of 20 wt %~30 wt %, and preferably 25 wt %~29 wt %. The binder includes, but not limited to polyvinyl alcohol (PVA), hydroxymethyl cellulose (CMC), and hydroxypropyl methyl cellulose (HPMC). In the present invention, the binder preferably includes water, polyvinyl alcohol, and hydroxypropyl methyl cellulose by a mass ratio of preferably (90~95):(3~5):(2~5), and more preferably (90~95):(3~5):(2~5).

The composition of the negative electrode active material for a nickel-zinc battery further includes an additive, which has a content of 5 wt %~10 wt %, and preferably 6 wt %~8 wt %. The additive serves to prevent the electrode from corroding, delay and inhibit the deformation of the electrode, and improve the performance of the nickel-zinc battery. In the present invention, the additive preferably includes nylon short fiber, polyfluortetraethylene emulsion, sodium alkyl benzene sulfonate, $Na_2HPO_4$ and water by a mass ratio of preferably (0.05~0.3):(3~7):(0.01~0.05):(0.1~0.3):(1~4), and more preferably (0.1~0.2):(0.02~0.04):(0.15~0.25):(2~3).

The negative electrode active material is preferably prepared by the following steps:

Mixing the binder and the additive, and agitating for 45 min; adding Zn powder, and agitating for 15 min; adding calcium hydroxide, zinc hydroxide, and water, and agitating for 3 min; adding $In(OH)_2$, and agitating for 30 min; adding $Bi_2O_3$, and agitating for 5 min; adding ZnO, and agitating for 1.5 h to provide a slurry of the composition of the negative electrode active material.

When the binder includes water, polyvinyl alcohol, hydroxypropyl emthylcellulose, and the additive includes nylon short fiber, polyfluortetraethylene emulsion, sodium alkyl benzene sulfonate, $Na_2HPO_4$ and water, the negative electrode active material is preferably prepared by the following steps:

firstly, heating the water bath to 60° C., adding olyvinyl alcohol and hydroxypropyl emthylcellulose thereto, and performing agitation for 4 h to provide a binder;

adding nylon short fiber to the binder, and agitating for 45 min;

adding Zn, and agitating for 15 min;

adding calcium hydroxide, zinc hydroxide, and water, and agitating for 3 min;

adding $In(OH)_2$, and agitating for 30 min;

adding $Bi_2O_3$, and agitating for 5 min;

adding polyfluortetraethylene emulsion (PTFE) having a mass concentration of 60%, and agitating for 5 min;

adding sodium dodecylbenzensulfonate (SDBS), and agitating for 5 min;

adding $Na_2HPO_4$, and agitating for 5 min;

finally, adding ZnO, and agitating for 1.5 h to provide a slurry of the composition of the negative electrode active material.

In the above preparing process, the vacuum pressure used during agitating is preferably −0.2 MPa.

When the composition of the negative electrode active material provided by the present invention is used in a nickel-zinc battery, it provides the battery with the advantages of slow capacity-fading speed, long cycling life, low internal resistance, stable performance, and the like.

The present invention further provides a negative electrode for a nickel-zinc battery, including the negative electrode substrate and the composition of the negative electrode active material stated in the above technical solutions, in which the composition of the negative electrode active material is coated on the negative electrode substrate.

For the purpose of improving the diffusing speed of oxygen at the surface of the negative electrode, it is preferred that the surface of the nickel-zinc battery has several crossed shallow grooves, which can increase the diffusing speed of protons in the solid phase of the negative electrode, thereby improving the charging/discharging efficiency of the nickel-zinc battery.

The present invention further provides a method for preparing the negative electrode of a nickel-zinc battery, including the steps of:

pretreating the opposite two sides of the negative electrode substrate according to the above technical solution in $Al_2O_3$ glue solution, which includes $Al_2O_3$, polyvinyl alcohol, and water;

coating the composition of the negative electrode active material on the pretreated negative electrode substrate, drying and rolling the substrate, and cutting the substrate along the symmetric axis of the pretreated two sides of the negative electrodes to provide a negative electrode semi-finished product;

soaking the symmetric surface of the cutting surface of the negative electrode semi-finished product in a glue solution including $Al_2O_3$, MgO, polyvinylidene fluoride emulsion, butadiene styrene rubber emulsion, polyvinyl alcohol, and water to provide a negative electrode for a nickel-zinc battery.

Firstly, the opposite two sides of the negative electrode substrate are pretreated in $Al_2O_3$ glue solution by the following steps:

heating PVA and water, which have a mass ratio of preferably 5~10:95~90, and more preferably 6:94 to a temperature of 55° C.~65° C., preferably 60° C., and agitating to provide a glue;

adding $Al_2O_3$ to the glue and uniformly agitating to provide $Al_2O_3$ glue solution, in which the glue and the $Al_2O_3$ have a mass ratio of preferably 95~90:5~10, and more preferably 97:3; the $Al_2O_3$ is preferably δ-$Al_2O_3$, which has a particle size of preferably 150 mesh to 200 mesh, and more preferably 170 mesh.

The opposite two sides of the negative electrode substrate according to the above technical solution are soaked in the $Al_2O_3$ glue solution for 2 min~5 min, preferably 3 min, and then the negative electrode substrate is dried in a drier at 60° C. to provide a pretreated negative electrode substrate.

When the negative electrode substrate obtains the structure as shown in FIG. 6, the two sides having protrusions of the negative electrode substrate is pretreated. Since $Al_2O_3$ has a poor conductivity, soaking the two sides having protrusions of the negative electrode substrate can reduce the conductivity of the two sides, thereby reducing the current at the edge and in turn the deformation of the negative electrode of the battery.

The slurry of the composition of the negative electrode active material according to the above technical solution is coated on the pretreated negative electrode substrate by the following steps:

pouring the slurry of the composition of the negative electrode active material into a slurry tank while under an agitation at 3 rad/s;

soaking the negative electrode substrate in the slurry tank so that the slurry is coated on the surface of the negative electrode substrate;

removing excessive slurry from the surface of the negative electrode substrate, preferably by using a squeegee mould to remove the excessive slurry from the surface of the negative electrode substrate.

The negative electrode substrate coated with the slurry is subjected to drying and rolling known by those skilled in the art, and then is cut along the symmetric axis of the pretreated two sides thereof to provide a negative electrode semi-finished product having a cutting surface without being coated with the negative electrode active material. In the present invention, the negative electrode substrate coated with the slurry is preferably dried in a drier, which preferably has five drying zones. The dried negative electrode substrate coated with the slurry is rolled to a certain thickness, and cut by a slicer along the symmetric axis of the pretreated two sides thereof to provide a negative electrode semi-finished product. When the negative electrode substrate obtains the structure shown in FIG. 6, it is cut along the length direction of the grooves to provide a negative electrode semi-finished product having a cutting surface without being coated with negative electrode active material.

The symmetric surface of the cutting surface of the negative electrode semi-finished product is soaked in a glue solution by the following steps:

heating PVA and water, which have a mass ratio of preferably 5~10:95~90, and more preferably 6:94 to 60° C., and agitating to provide a glue;

mixing the glue, $Al_2O_3$, MgO, PTFE emulsion having a mass concentration of 60%, and SBR emulsion by a mass ratio of preferably 85~95:1~2:0.5~1:1.5~2, and more preferably 91:1.33:0.97:5:1.7; and soaking the symmetric surface of the cutting surface of the negative electrode semi-finished product in the glue solution to provide a negative electrode for a nickel-zinc battery.

When the negative electrode substrate has the structure shown in FIG. 6, the side having protrusions is the symmetric surface of the cutting surface. Soaking the side having protrusions in the glue solution can provide good binding effect, and prevent the edges from falling off due to the swelling of the plate during charging/discharging process, thereby increasing the use life of the negative electrode.

Before the symmetric surface of the cutting surface of the negative electrode semi-finished product is soaked in the glue solution, the two other sides of the negative electrode semi-finished product are preferably wrapped with a membrane separator to protect the negative electrode.

In the negative electrode for a nickel-zinc battery prepared by the above method, the cutting surface without being coated with negative electrode active material can serve as the channel for diffusing and conducting the current in the negative electrode plate.

For the purpose of improving the diffusing speed of oxygen at the surface of the negative electrode, it is preferred that the surface of the nickel-zinc battery is pressed with several crossed shallow grooves, which can increase the diffusing speed of protons in the solid phase of the negative electrode, thereby improving the charging/discharging efficiency of the nickel-zinc battery. In the present invention, the surface of the negative electrode for a nickel-zinc battery is preferably rolled by a bearing having bulged stripes.

The negative electrode provided by the present invention has the advantages of simple structure and simple preparing process. The treatment performed on the four edges of the negative electrode plate prevents zinc from growing outward, and thus avoids the failure of the battery. Furthermore, the cutting surface of the negative electrode plate provided by the present invention, which is not coated with negative electrode active material, can serve as the channel for guiding and diffusing a current, so as to prevent the plate from being deformed due to high amount of heat produced during the passing of current. It can also effectively inhibit zinc from grow dendrites at a certain conductive point, improving the reliability and stability of the battery.

The negative electrode provided by the present invention, a nickel positive electrode, and electrolyte are assembled to a cylindrical nickel-zinc battery, most of which are tested for the performance. The results showed that the nickel-zinc battery provided by the present invention has lower internal resistance, slower capacity fading, and longer cycling life.

The present further invention provides a method for preparing a membrane separator of a battery, including the steps of:

separately drawing a first polypropylene film and a second polypropylene film downward at −3~−7° C., and keeping at 45~60° C. to provide a first polypropylene microporous film and a second polypropylene microporous film;

perpendicularly compounding the polypropylene microporous film and the second polypropylene microporous film along the drawing direction to provide a polypropylene microporous composite film; and hydrophilically treating the polypropylene microporous composite film to provide a membrane separator of a battery.

The first polypropylene film is preferably prepared by dry unilateral tension, and has low crystallinity and high orientation. Preferably, the first polypropylene film has a pore size of 7~15 μm, more preferably 8~14 μm, most preferably 10~13 μm. The temperature at which the first polypropylene film is drawn is preferably −4~−6° C., and more preferably −5~−6° C.; and the temperature at which the first polypropylene film is kept is preferably 50~60° C., and more preferably 53~58° C.

The second polypropylene film is preferably the same as the first polypropylene film. The temperature at which the second polypropylene film is unilaterally drawn is preferably −4~−6° C., and more preferably −5~−6° C.; and the temperature at which the second polypropylene film is kept is preferably 50~60° C., and more preferably 53~58° C. The second polypropylene film has a pore size of preferably 7~15 μm, more preferably 8~14 μm, most preferably 10~13 μm.

Taking the first polypropylene film as an example, it forms small wrinkling defects upon drawing at −3~−7° C., which are then stretched upon being kept at 45~60° C. to form prolate micro-pores. Similarly, since the second polypropylene film is treated by the same method as that for the first polypropylene film, it similarly has the same prolate micro-pores.

Since the first polypropylene film and the second polypropylene film are simply one-way drawn and formed with prolate micro-pores, they has poorer horizontal tensile strength. Therefore, the present invention perpendicularly compounds the first polypropylene microporous film and the second polypropylene microporous film along the drawn direction to obtain a polypropylene microporous composite film, in which the first polypropylene microporous film and the second polypropylene microporous film are in staggered position, so that the longitudinal and horizontal tensile strengths of the obtained polypropylene microporous composite film are significantly improved compared with the films before compounding.

Moreover, after perpendicularly compounds the first polypropylene microporous film and the second polypropylene microporous film along the drawn direction, the present invention joints the straight micro-pores in the first polypropylene microporous film and the second polypropylene microporous film in a disposition way to form curved pores, so as to block the pass of zinc micro-particles and zincate while allowing the pass of organic ions, thereby avoiding the penetration of dendrites. The polypropylene microporous composite film preferably has a pore size of 1~5 μm, and more preferably 1.5~4 μm.

In the present invention, the first polypropylene microporous film and the second polypropylene microporous film are preferably compounded by using a rolling device, and more preferably by using a rolling device having a diameter of 4.5~5.5 m and a length of 6.5~7.5 m under heating.

Figure 7:
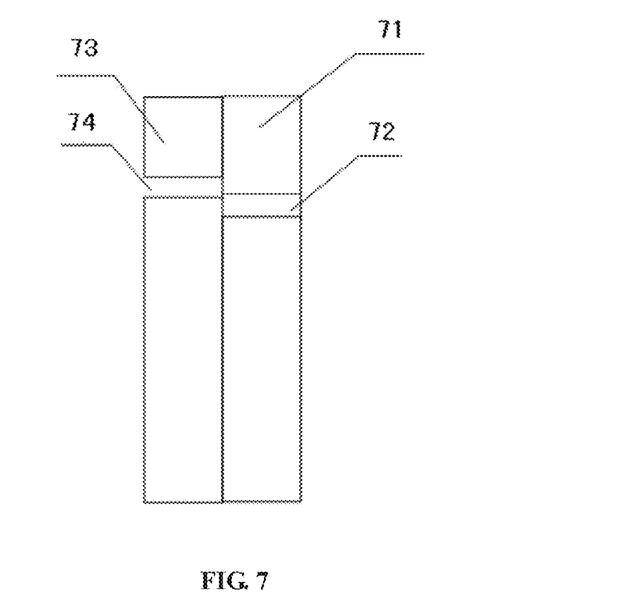
FIG. 7 is a structural diagram of a membrane in the nickel-zinc secondary battery provided by the present invention.

FIG. 7 is a structural diagram of the membrane separator of a battery provided by the present invention. It can be seen from FIG. 7 that the first polypropylene microporous film 71 has a first micro-pore 72, and the second polypropylene microporous film 73 has a second micro-pore 74; the first polypropylene microporous film 71 and the second polypropylene microporous film 73 are compounded together so that the first micro-pore 72 and the second second micro-pore 74 are dislocated to form a curved pore which has a greatly reduced size in comparison with those of the first microporous film 72 and the second micro-pore 74.

The polypropylene microporous composite film prepared above has a thickness of preferably 0.015~0.10 mm, and more preferably 0.02~0.08 mm; an areal density of preferably 12~43 g/m$^2$, and more preferably 20~40 g/m$^2$; an air permeability of preferably 35~56%, and more preferably 40~55%; an anti-piercing strength of preferably 8~50N, and more preferably 10~30N; a longitudinal tensile strength of preferably 1500~1950 kgf/cm$^2$, and more preferably 1600~1800 kgf/cm$^2$; a horizontal tensile strength of preferably 300~657 kgf/cm$^2$, and more preferably 400~600 kgf/cm$^2$; and a longitudinal high-temperature resistance (90°/2 h) of preferably 0.5~2.3%.

In the present invention, the step of hydrophilically treating the polypropylene microporous composite film includes:

Soaking the polypropylene microporous composite film in the treating solution of the membrane separator of a battery for 1-5 hours, and drying, wherein the treating solution of the membrane separator of a battery includes the following components by weight percentage: 1.85 wt %~2 wt % fluoro-carbon surfactant; 1.3 wt %~1.5 wt % flatting agent; 1.4 wt %~1.7 wt % non-ion surfactant; and 95 wt %~95.4 wt % water. The drying temperature is preferably 30~80° C., and more preferably 30~70° C. The drying process includes: baking the polypropylene microporous composite film after standing in the treating solution for 1~5 hours in a horizontal drying device having four temperature zones of 70° C., 60° C., 45° C., and 30° C., respectively. In addition, the treatment after the hydrophilic treatment includes: coiling up the membrane separator, preferably by using a driven bearing.

The polypropylene microporous composite film and the treating solution for the membrane separator has an area/mass ratio of preferably (30 m$^2$~50 m$^2$):(20 Kg~30 Kg), more preferably (35 m$^2$~45 m$^2$):(22 Kg~28 Kg), more preferably 40 m$^2$:25 Kg. Upon the hydrophilic treatment, the polypropylene microporous composite film is increased in weight by preferably 2.3~4.5 g/m$^2$, more preferably 2.5~4.2 g/m$^2$, and most preferably 2.8~4 g/m$^2$.

The fluoro-carbon surfactant is preferably INTECHEM-01 fluoro-carbon surfactant. It is an alkyl ether negative ion surfactant, having many of the excellent properties of negative and non-ion surfactants and capable of greatly reducing the surface tension of the electrolyte solution. Moreover, the surfactant is a low foaming surfactant, facilitating observing the wetting of the film. In the treating solution for the membrane separator, the content of the fluoro-carbon surfactant is preferably 1.88 wt %~1.95 wt %, more preferably 1.9 wt %~1.92 wt %, and most preferably 1.903 wt %.

The leveling agent used in the present invention is preferably wetting leveling agent, and more preferably KY-1028A wetting leveling agent. It is a polyether-modified organo-silicone, and has good anticratering performance and good effect in reducing the tension of the solution, so that the treating solution of the membrane separator of the battery can be uniformly distributed on the surface of the polypropylene microporous composite film. In the treating solution of the membrane separator of the battery, the content of the leveling agent is preferably 1.3 wt %~1.45 wt %, more preferably 1.32 wt %~1.4 wt %, and most preferably 1.343 wt %.

The non-ion surfactant is preferably FCNTACARE-1202 non-ion surfactant. It can provide abundant hydrophilic functional groups on the surface of the polypropylene microporous composite film and the micro-pores, playing an important role in the wetting and liquid absorption of the micro-pores. In the treating solution of the membrane separator of the battery, the content of the non-ion surfactant is preferably 1.45 wt %~1.6 wt %, more preferably 1.5 wt %~1.55 wt %, and most preferably 1.523 wt %.

The present invention also provides a method for preparing a treating solution for a membrane separator of a battery, including the steps of:

adding 1.4 wt %~1.7 wt % non-ion surfactant to 95 wt %~95.4 wt % water, and mixing to provide a first solution; and separately Adding 1.85 wt %~2 wt % fluoro-carbon surfactant and 1.3 wt %~1.5 wt % flatting agent to the first solution, and mixing to provide the treating solution for the membrane separator of a battery.

Further, the present invention preferably includes pre-treating the water at a temperature of preferably 50~70° C., and more preferably 60° C.

In the step of obtaining the first mixed solution, the mixing is performed preferably by agitating, at a speed of preferably 2~10 rad/1 s and more preferably 3~5 rad/1 s, preferably for 10~30 min, and more preferably for 15 min. In the step of obtaining the treating solution for the membrane separator of the battery, the mixing is performed preferably by agitating, at a speed of preferably 1~2 rad/1 s and more preferably 1.5~1.7 rad/1 s, preferably for 50~100 min, and more preferably for 60~80 min.

Figure 8:
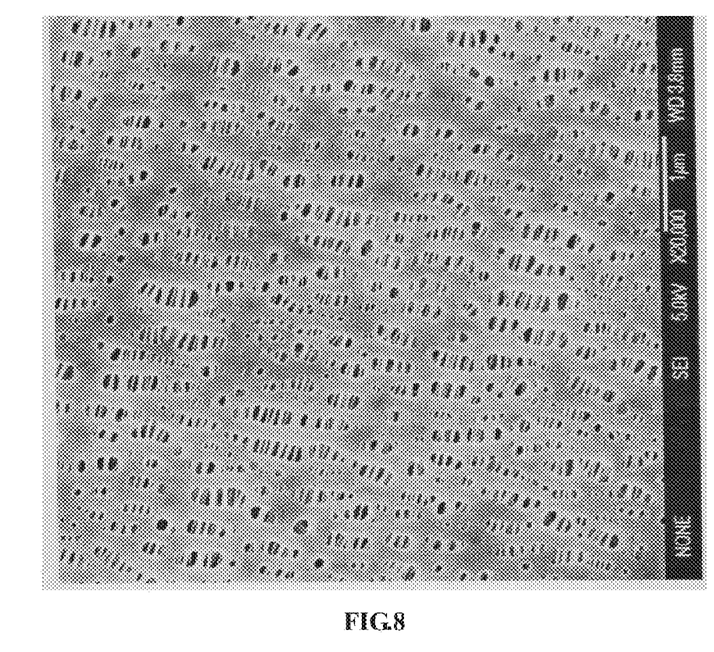
FIG. 8 is an SEM image of the membrane in the nickel-zinc secondary battery provided by the present invention.

The membrane separator of the battery prepared according to the present invention can be evaluated for its liquid-absorption ratio, material loading mount, surface resistance, and the like by the methods well-known by those skilled in the art. The results showed that the membrane separator of the battery prepared according to the present invention meet the requirements for a nickel-zinc battery. According to the present invention, FIG. 8 shows an SEM image of the membrane separator prepared according to the present invention. It can be seen from FIG. 8 that the membrane separator prepared in the present invention has uniform pore size and distribution.

The present invention further provides a method for preparing a nickel-zinc secondary battery, including the steps of: a) winding a nickel positive electrode, a membrane separator, and a zinc negative electrode to provide an electrode assembly; the membrane separator being disposed between the nickel positive electrode and the zinc negative electrode; the nickel positive electrode including: a substrate and positive electrode material coated on the surface of the substrate, the positive electrode material including: 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance; the positive electrode active material is a spherical nickel hydroxide coated with $Co^{3+}$; b) fixing the electrode assembly in a battery case, in which an electrolyte solution is filled; and c) packaging the battery case filled with the electrolyte solution to provide a nickel-zinc secondary battery.

Figure 2:
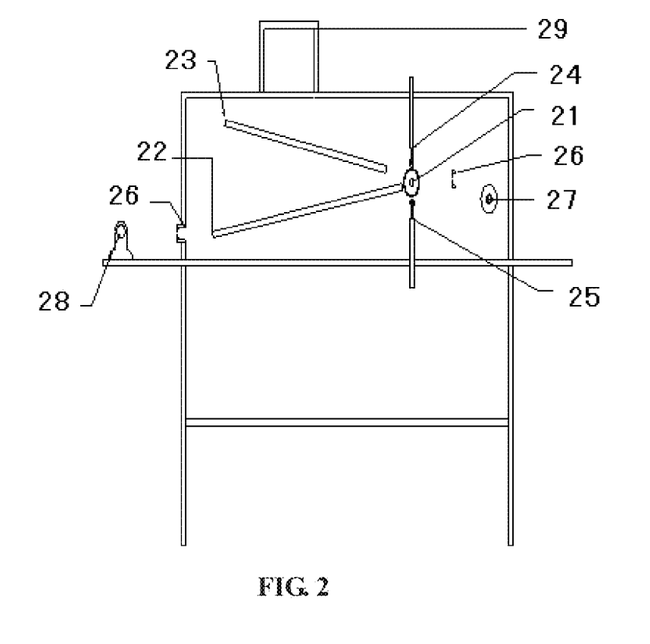
FIG. 2 is a structural diagram of a winding machine used for preparing the nickel-zinc secondary battery provided by the present invention.

According to the present invention, a winding machine shown in FIG. 2 is preferably used to assembly the composite membrane separator, the soft nickel positive electrode, and the soft zinc negative electrode by soft winding. The winding machine includes: a winding needle 21, a lower rail 22, an upper rail 23, an upper winding clap 24, a lower winding clamp 25, an automatic sensing scissors 26, an adhesive tape carrying bearing 27, a motor-driven membrane separator caning bearing 28, and a controlling touch screen 29. The winding needle is adjustable in rotating speed, and driven by a synchronous motor, having a diameter of preferably 0.5~50 mm the winding needle can be a telescopic single needle with staggered cylindrical surface, or a double-needle including two smooth semi-cylindrical bodies, one of which is telescopic. The lower rail is used for placing and positioning the zinc negative electrode and the membrane separator, and can be slipped back and forth. The upper rail is used for placing and positioning the nickel positive electrode, and can be slipped back and forth. The adhesive tape carrying bearing is driven by a synchronous motor, for carrying and feeding a hydrophobic, high-temperature resistant, and alkali resistant adhesive tape. The motor-driven membrane separator caning bearing is a bearing for carrying and feeding the composite membrane separator, driven by a synchronous motor. The automatic sensing scissors cut off the composite membrane separator and the continuous hydrophobic, high-temperature resistant, and alkali resistant adhesive tape. The upper winding clamp and the lower winding clamp are respectively disposed above and below the winding needle, including rotatable bearings for fixing and clamping the electrode clamp during winding so that it can form a smooth arc shape.

According to the present invention, the nickel-zinc secondary battery is preferably prepared by the process including the steps of:

1. feeding the membrane separator via the composite membrane feeder to the membrane positioning slot in the lower rail, with the side of microporous polypropylene film facing upward and the other side of the grafted polypropylene nonwoven fabrics facing downward, and surrounding the winding needle;

2. disposing the zinc negative electrode in the positioning slot on the lower rail, with the exposed, uncoated longitudinal edge of the substrate facing the operator and extending 0.5-3 mm beyond the edge of the membrane separator, and the front end of the zinc negative electrode being 3-5 mm far from the winding needle;

3. folding the composite membrane separator around the winding needle, so that the front end of the membrane separator is completely overlapped with the rear end of the negative electrode, and completely covers the zinc negative electrode plate; and cutting the composite membrane separator by the automatic sensing scissors;

4. operating the upper and lower clamps to tightly clamp the winding needle, and rotating the winding needle counterclockwise to rotate the zinc electrode together with the composite membrane separator for one lap;

5. disposing the nickel positive electrode in the positive electrode positioning slot on the upper rail, with the exposed, uncoated longitudinal edge of the substrate being opposite to the operator and extending 0.5-3 mm beyond the edge of the membrane separator, and the front end of the nickel positive electrode being close to the winding needle;

6. running the winding needle counterclockwise at a uniform speed, so that the membrane separator, the soft zinc negative electrode, and the soft nickel positive electrode are assembled into a standard cylindrical electrode assembly, at one end of which the uncoated longitudinal edge of the negative electrode extends 0.5-3 mm beyond the membrane separator, and at the other end the uncoated longitudinal edge of the positive electrode extends 0.5-3 mm beyond the membrane separator; and the outer periphery of which is wrapped with a layer of hydrophobic, high temperature-resistant, alkali-resistant adhesive tape;

7. turning the uncoated edge of the wound nickel positive electrode (which extends 0.5-3 mm beyond the end surface of the electrode assembly upon soft winding) from outside to inside by a degree of 90° to exhibit a flat positive electrode conductive end surface; turning the uncoated edge of the wound zinc negative electrode (which extends 0.5-3 mm beyond the end surface of the electrode assembly upon soft winding) from outside to inside by a degree of 90° to exhibit a flat negative electrode conductive end surface; and covering the outmost layer of the wound zinc negative electrode with a layer of alkali resistant, insulating, high temperature-resistant adhesive tape;

8. loading the wound electrode assembly (with the positive electrode facing downward) into a lower current collector steel container welded with uniform burrs, and pressing the electrode assembly toward the bottom of the container by using a nylon rod having the same diameter as that of the electrode assembly, so that the burrs of the lower current collector can be pierced into the positive electrode conductive end surface to ensure well contact between them;

9. passing a single-needle welder through the hole in the middle of the finished electrode assembly to weld the anti-shock conductive metal tab extended from the positive electrode onto the bottom of the container; processing a groove depressing toward the inside of the steel container by a channeling machine at a certain distance below the opening of the steel container; coating the inner wall part of the steel container above the groove with the a layer of electrolytic asphalt oil, and standing for 45 minutes for drying; and switching a digital multimeter to the grade of "Ω" to measure the internal resistance of the battery, which provides an internal resistance value of 25Ω;

10. filling each of the batteries with an electrolyte solution for many times through a precisely injecting pump by a weight deviation of the electrolyte solution of ≤0.02 g; pumping a set vacuum value of 0.15-0.5 Mpa in each battery filled with the electrolyte solution by evacuating the air in each battery with an evacuation device to facilitate the permeating of the electrolyte solution into the battery; and standing each battery filled with the electrolyte solution for 10-180 min;

11. placing an assembly formed by welding the anti-liquid-leakage cap and the upper current collector made of beryllium bronze in the sealing ring made of nylon 66 and coated with sealing adhesive, and fastening the same;

12. switching a digital multimeter to the grade of "V" to measure the internal resistance of the battery, which provides an internal resistance value of ≥1.4V;

13. sealing each of the batteries by using a stamping sealing machine (see the sectional view-1 of the battery); and 14. soaking the sealed batteries in a boric acid-saturated solution for 5 minutes to wash the alkali solution attached on the batteries; soaking the batteries in a container filled with industrial alcohol for 15 minutes; and taking out the batteries by a perforated plastic basket and drying the batteries one by one in a drier.

A nickel-zinc secondary battery provided by the present invention and a method for preparing the same are described above in details. The principle and the embodiments of the present invention are explained in combination with particular embodiments, which are intended to help understand the method and the core concept of the present invention. It should be noted that, improvements and modifications can be made by those skilled in the art without departing from the scope of the present invention. These improvements and modifications should fall within the protection scope defined by the claims of the present invention.

What is claimed is:

1. A nickel-zinc secondary battery, characterized by comprising:
    a battery case;
    an electrode assembly, disposed in the battery case;
    an electrolyte solution, positioned in the battery case, and filled around the electrode assembly,
    wherein the electrode assembly comprises a nickel positive electrode, a zinc negative electrode, and a membrane separator disposed between the nickel positive electrode and the zinc negative electrode;
    wherein the zinc negative electrode comprises a negative electrode substrate and a composition of negative electrode active material coated on the negative electrode substrate, the negative electrode substrate having a surface having several crossed shallow grooves, the negative electrode active material comprising:
    40 wt %~60 wt % ZnO;
    5 wt %~10 wt % Zn;
    1.5 wt %~3.5 wt % $Zn(OH)_2$;
    0.5 wt %~2 wt % $Ca(OH)_2$;
    0.5 wt %~3 wt % $Bi_2O_3$;
    0.001 wt %~0.02 wt % $In(OH)_2$;
    20 wt %~30 wt % binder; and
    5 wt %~10 wt % additive; and
    wherein the nickel positive electrode comprises: a substrate and positive electrode material coated on the surface of the substrate; the positive electrode material comprises: 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance, the binder is a mixture of polyfluortetraethylene emulsion and hydroxymethyl cellulose solution wherein the polyfluortetraethylene emulsion has a concentration of 50 wt %~70 wt, or a mixture of polyfluortetraethylene and hydroxypropyl methyl cellulose solution wherein the polyfluortetraethylene has a concentration of 50 wt %~70 wt; and the positive electrode active material is a spherical nickel hydroxide coated with $Co^{3+}$.

2. The nickel-zinc secondary battery according to claim 1, characterized in that the negative electrode substrate comprises: a first zinc foil layer; a copper foil layer compounded on the first zinc foil layer; and a second zinc foil layer compounded on the copper foil layer.

3. The nickel-zinc secondary battery according to claim 1, characterized in that the nickel positive electrode further comprises: a locating adhesive layer coated on the lower surface of the substrate and positioned on one side of the positive electrode material, the locating adhesive layer being formed by drying an adhesive, which is a mixture of polyfluortetraethylene emulsion and hydroxypropyl methyl cellulose solution.

4. The nickel-zinc secondary battery according to claim 3 wherein the polyfluortetraethylene emulsion and hydroxypropyl methyl cellulose solution in the adhesive has a weight ratio of 1:4~6, the polyfluortetraethylene emulsion has a concentration of 55 wt %~65 wt %, and the hydroxypropyl methyl cellulose solution has a concentration of 0.5-0.8 wt %.

5. The nickel-zinc secondary battery according to claim 1, characterized by further comprising:
    a cap, disposed at one end of the electrode assembly;
    a negative electrode current collecting disc, disposed between the cap and the electrode assembly; and
    a positive electrode current collecting disc, disposed at the other end of the electrode assembly,
    wherein the negative electrode current collecting disc and the positive electrode current collecting disc are located in the battery case.

6. A method for preparing a nickel-zinc secondary battery, characterized by comprising:
    a) winding a nickel positive electrode, a membrane separator and a zinc negative electrode to form an electrode assembly, the membrane separator being disposed between the nickel positive electrode and the zinc negative electrode; the nickel positive electrode comprising: a substrate and positive electrode material coated on the surface of the substrate; the positive electrode material comprising: 68 wt %~69 wt % positive electrode active material, 0.6 wt %~1 wt % yttrium oxide, 0.2 wt %~0.6 wt % calcium hydroxide, 3.5 wt %~4 wt % nickel powder, and a binder in balance, the binder is a mixture of polyfluortetraethylene emulsion and hydroxymethyl cellulose solution wherein the polyfluortetraethylene emulsion has a concentration of 50 wt %~70 wt, or a mixture of polyfluortetraethylene and hydroxypropyl methyl cellulose solution wherein the polyfluortetraethylene has a concentration of 50 wt %~70 wt; and the positive electrode active material being a spherical nickel hydroxide coated with $Co^{3+}$, wherein the zinc negative electrode comprises a negative electrode substrate and a composition of the negative electrode active material coated on the negative electrode substrate, the negative electrode substrate having a surface having several crossed shallow grooves, the negative electrode active material comprising:
40 wt %~60 wt % ZnO;
5 wt %~10 wt % Zn;
1.5 wt %~3.5 wt % Zn(OH)$_2$;
0.5 wt %~2 wt % Ca(OH)$_2$;
0.5 wt %~3 wt % Bi$_2$O$_3$;
0.001 wt %~0.02 wt % In(OH)$_2$;
20 wt %~30 wt % binder; and
5 wt %~10 wt % additive; and b) fixing the electrode assembly in the battery case, and filling the battery case with electrolyte solution; and c) packaging the battery case filled with the electrolyte solution in step b) to form a nickel-zinc secondary battery.

7. The method according claim 6, characterized in that, step a) comprises the steps of:
a1) placing the membrane separator in a membrane positioning slot in the lower rail of a winding machine, and placing the zinc negative electrode in the negative electrode positioning slot in the lower rail of the winding machine, which is folded back after bypassing the winding needle, so that the front end of the membrane separator is overlapped with the tail end of the negative electrode;
a2) counterclockwise rotating the winding needle so that the zinc negative electrode and the composite membrane rotate one loop together; and
a3) placing the nickel positive electrode in the positive electrode positioning slot of the upper rail of the winding machine, and counterclockwise rotating the winding needle, while winding the membrane separator, the zinc negative electrode, and the nickel positive electrode into an electrode assembly.

8. The method according to claim 7, characterized in that, at one end of the electrode assembly, the longer side of the negative electrode substrate without being coated with the composition of the negative electrode active material extends 0.5-3 mm beyond the membrane separator, and is processed into the conductive end surface for the negative electrode; at the other end of the electrode assembly, the longer side of the positive electrode substrate coated with the positive electrode extends 0.5-3 mm beyond the membrane separator, and is processed into a conductive end surface for the positive electrode; and the outmost surface of the electrode assembly is wrapped with a layer of continuous adhesive tape which is hydrophobic, and resistant to high temperature and alkali.

9. The method according to claim 6, characterized in that, the step b) comprises the steps of:
b1) packaging the electrode assembly into a battery case having a positive electrode current-collecting disc with uniformly distributed blurs, with the positive electrode heading downward, so that the electrode assembly is fully contacted with the positive electrode current-collecting disc; and
b2) extending a shock-proof conductive metal tape from the nickel positive electrode and welding the same on the bottom of the battery case.

10. The method according claim 9, characterized in that the battery case is vacuumed to a vacuum of 0.15-0.5 Mpa when filling the electrolyte solution.

11. The method according to claim 6, characterized in that step c) comprises the steps of:
c1) disposing a sealing ring at the opening the battery case, and coating a sealing adhesive on the sealing ring; and
c2) placing a combined part formed by welding a cap and a negative electrode current-collecting disc in the sealing ring coated with the sealing adhesive, fixating, and drying to form a nickel-zinc secondary battery.

* * * * *